US010129008B2

(12) United States Patent
Ebihara et al.

(10) Patent No.: US 10,129,008 B2
(45) Date of Patent: Nov. 13, 2018

(54) MODULE

(71) Applicant: TAIYO YUDEN CO., LTD., Tokyo (JP)

(72) Inventors: Hitoshi Ebihara, Tokyo (JP); Naoto Kobayashi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 34 days.

(21) Appl. No.: 15/270,947

(22) Filed: Sep. 20, 2016

(65) Prior Publication Data

US 2017/0093554 A1    Mar. 30, 2017

(30) Foreign Application Priority Data

Sep. 24, 2015  (JP) ................. 2015-187450

(51) Int. Cl.
*H04L 5/14* (2006.01)
*H04L 12/947* (2013.01)
*H04W 84/12* (2009.01)

(52) U.S. Cl.
CPC ............ *H04L 5/1461* (2013.01); *H04L 49/25* (2013.01); *H04W 84/12* (2013.01)

(58) Field of Classification Search
CPC ....... H04L 5/1461; H04L 49/25; H04W 84/12
See application file for complete search history.

(56) References Cited

U.S. PATENT DOCUMENTS

| 2002/0095271 A1* | 7/2002 | Brinsfield ............ A61B 5/0006 |
| | | 702/189 |
| 2004/0218928 A1* | 11/2004 | Cotter ................ H04B 10/2914 |
| | | 398/177 |
| 2005/0143023 A1* | 6/2005 | Shih ........................ H04B 1/005 |
| | | 455/101 |
| 2009/0170444 A1* | 7/2009 | Retnasothie .......... H04B 1/0039 |
| | | 455/73 |

(Continued)

FOREIGN PATENT DOCUMENTS

| JP | 2013-62556 A | 4/2013 |
| WO | 2014/005061 A1 | 1/2014 |

OTHER PUBLICATIONS

Japanese Office Action dated Feb. 20, 2018, in a counterpart Japanese patent application No. 2015-187450. (A machine translation (not reviewed for accuracy) attached.)

*Primary Examiner* — Ajay Cattungal
(74) *Attorney, Agent, or Firm* — Chen Yoshimura LLP

(57) ABSTRACT

A module includes: a first filter connected between an antenna terminal and a first terminal and allowing a signal in a first frequency band from 2.4 to 2.5 GHz to pass therethrough; a second filter connected between the antenna terminal and a second terminal and allowing a signal in a second frequency band from 5.0 to 6.0 GHz to pass therethrough; a switch selecting and connecting a first or second port to the antenna; a third filter connected between the first port and a third terminal and allowing a signal in a third frequency band between the first and second frequency bands to pass therethrough; and a fourth filter connected (Continued)

between the second port and a fourth terminal and allowing a signal in a fourth frequency band that is between the first and second frequency bands and partially overlaps or is continuous with the third frequency band to pass therethrough.

9 Claims, 8 Drawing Sheets

(56) References Cited

U.S. PATENT DOCUMENTS

| | | | | |
|---|---|---|---|---|
| 2012/0274417 A1* | 11/2012 | Kihara | ............... | H03H 7/38 |
| | | | | 333/133 |
| 2013/0010885 A1* | 1/2013 | Kim | ............... | H04B 7/0691 |
| | | | | 375/267 |
| 2014/0003300 A1* | 1/2014 | Weissman | ............ | H04B 7/0404 |
| | | | | 370/273 |
| 2014/0321312 A1* | 10/2014 | Narahashi | ............ | H04B 1/525 |
| | | | | 370/252 |
| 2014/0329475 A1* | 11/2014 | Ella | ............... | H04B 1/006 |
| | | | | 455/77 |
| 2016/0028152 A1* | 1/2016 | Anguera Pros | ........ | H01Q 5/335 |
| | | | | 343/702 |

* cited by examiner

MODULE

CROSS-REFERENCE TO RELATED APPLICATION

This application is based upon and claims the benefit of priority of the prior Japanese Patent Application No. 2015-187450, filed on Sep. 24, 2015, the entire contents of which are incorporated herein by reference.

FIELD

A certain aspect of the present invention relates to a module.

BACKGROUND

Communication devices such as mobile phones have expanded their functions including the connection to the Internet. To cope with increase in communication data, technologies such as, for example, Long Term Evolution (LTE)-Advanced have been developed. To support multiple bands and reduce device size, there has been suggested a multiplexer in which a duplexer and a filter are connected in parallel to an antenna terminal through a matching circuit as disclosed in, for example, Japanese Patent Application Publication No. 2013-62556.

In the LTE system, to cope with increase in communication data, new bands such as, for example, Band42 (3400 MHz to 3600 MHz) and Band43 (3600 MHz to 3800 MHz) have been added. However, the conventional LTE system is designed to support transmission and reception of signals with frequencies of, for example, 700 to 2700 MHz, and thus has difficulty in supporting transmission and reception of signals with high frequencies such as 3400 to 3800 MHz.

SUMMARY OF THE INVENTION

According to an aspect of the present invention, there is provided a module including: a first filter that is connected between an antenna terminal and a first terminal, and allows a transmission signal and/or a reception signal in a first frequency band from 2.4 GHz to 2.5 GHz to pass therethrough, the antenna terminal being coupled to an antenna; a second filter that is connected between the antenna terminal and a second terminal, and allows a transmission signal and/or a reception signal in a second frequency band from 5.0 GHz to 6.0 GHz to pass therethrough; a switch that includes a first terminal and a second terminal, and selects and connects one of the first terminal and the second terminal to the antenna; a third filter that is connected between the first terminal of the switch and a third terminal, and allows a transmission signal and/or a reception signal in a third frequency band between the first frequency band and the second frequency band to pass therethrough; and a fourth filter that is connected between the second terminal of the switch and a fourth terminal, and allows a transmission signal and/or a reception signal in a fourth frequency band that is between the first frequency band and the second frequency band and partially overlaps with or is continuous with the third frequency band to pass therethrough.

DETAILED DESCRIPTION

Hereinafter, embodiments of the present invention will be described with reference to the accompanying drawings.

First Embodiment

Figure 1:
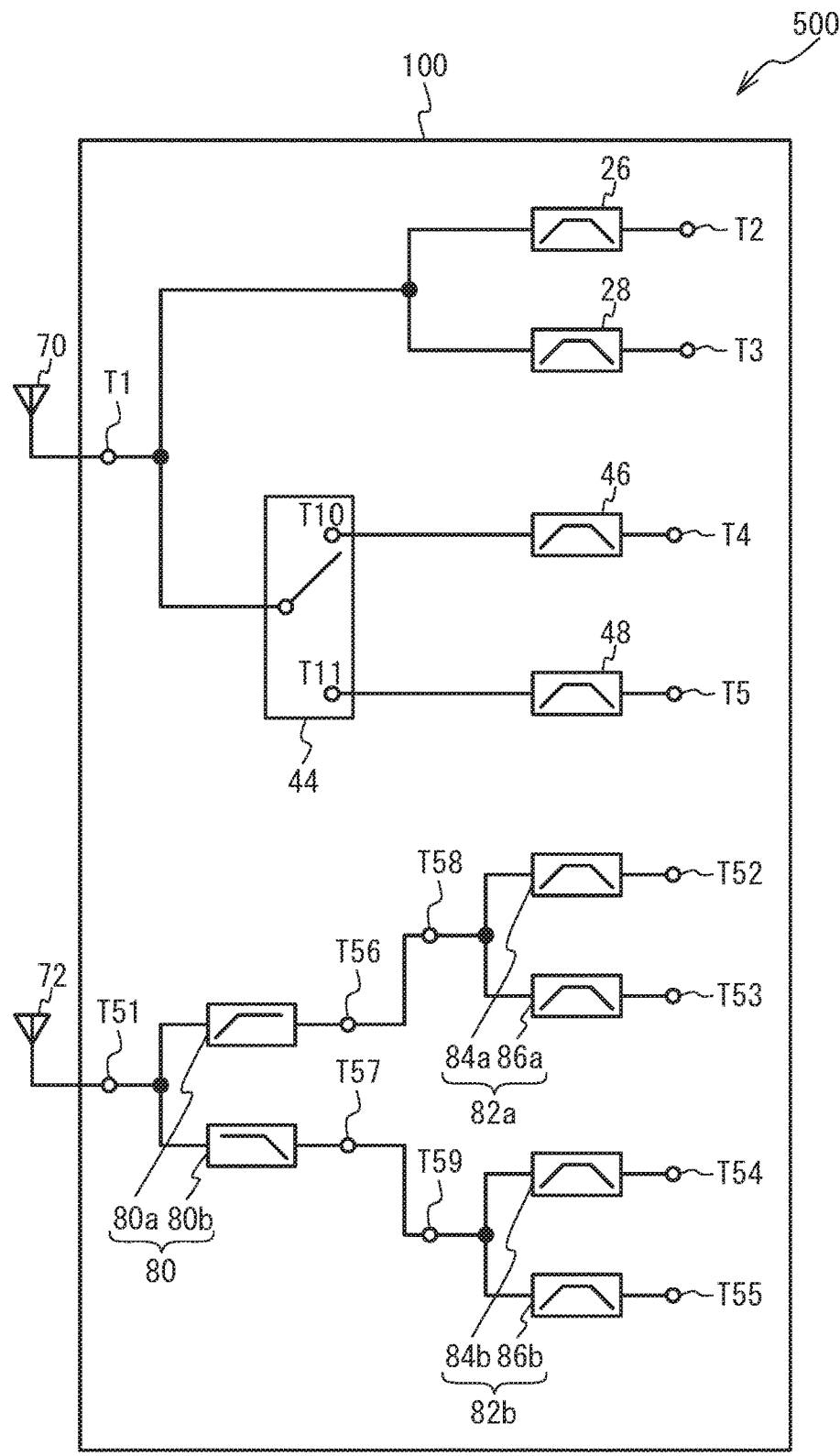
FIG. 1 illustrates a system including a module in accordance with a first embodiment.

FIG. 1 illustrates a system 500 including a module 100 in accordance with a first embodiment. As illustrated in FIG. 1, the system 500 includes the module 100, and antennas 70 and 72. The module 100 includes a switch 44, filters 26, 28, 46, and 48, a diplexer 80, and duplexers 82a and 82b.

The filter 26 is connected between an antenna terminal T1, which is coupled to the antenna 70, and a terminal T2. The filter 28 is connected between the antenna terminal T1 and a terminal T3. The switch 44 includes terminals T10 and T11, and selects and connects one of the terminals T10 and T11 to the antenna 70. The filter 46 is connected between the terminal T10 of the switch 44 and a terminal T4. The filter 48 is connected between the terminal T11 of the switch 44 and a terminal T5.

The filter 26 allows transmission signals and reception signals in a first frequency band from 2.4 GHz to 2.5 GHz to pass therethrough. The filter 26 allows transmission signals and reception signals transmitted and received through a Wireless Local Area Network (WLAN) of, for example, IEEE 802.11b standard (communication band: 2400 MHz to 2500 MHz) to pass therethrough. That is, the first frequency band ranges, for example, from 2400 MHz to 2500 MHz. The filter 28 allows transmission signals and reception signals in a second frequency band from 5.0 GHz to 6.0 GHz to pass therethrough. The filter 28 allows transmission signals and reception signals transmitted and received through a WLAN of, for example, IEEE 802.11a standard (communication band: 5470 MHz to 5725 MHz) to pass therethrough. That is, the second frequency band ranges, for example, from 5470 MHz to 5725 MHz.

The filter 46 allows transmission signals and reception signals in a third frequency band between the first frequency band and the second frequency band to pass therethrough. The filter 46 allows transmission signals and reception signals in, for example, Band42 (passband: 3400 MHz to 3600 MHz) to pass therethrough. That is, the third frequency band ranges, for example, from 3400 MHz to 3600 MHz. The filter 48 allows transmission signals and reception signals in a fourth frequency band, which is between the first frequency band and the second frequency band and continuous with the third frequency band, to pass therethrough. The filter 48 allows transmission signals and reception signals in, for example, Band43 (passband: 3600 MHz to 3800 MHz) to pass therethrough. That is, the fourth frequency band ranges, for example, from 3600 MHz to 3800 MHz. The filters 46 and 48 employ Time Division Duplex (TDD) for communication.

The filters 26, 28, 46 and 48 respectively transmit transmission signals in the passband to the antenna terminal T1 among transmission signals output from the terminals T2 through T5, and suppress signals in other bands. Transmission signals output to the antenna terminal T1 are transmitted from the antenna 70. In addition, the filters 26, 28, 46, and 48 allow reception signals in the passband to pass therethrough among signals received by the antenna 70 and output from the antenna terminal T1, and suppress signals in other bands.

The filters 26, 46 and 48 are bandpass filters such as acoustic wave filters formed of, for example, piezoelectric thin film resonators. The filter 28 is a bandpass filter such as, for example, a ceramic multilayer filter. Alternatively, the filters 26, 46, and 48 may be ceramic multilayer filters, and the filter 28 may be an acoustic wave filter formed of a piezoelectric thin film resonator. Alternatively, the filters 26, 28, 46, and 48 may be other filters.

The diplexer 80 includes a High Pass Filter (HPF) 80a and a Low Pass Filter (LPF) 80b. The HPF 80a is connected between an antenna terminal T51, which is coupled to the antenna 72, and a terminal T56. The LPF 80b is connected between the antenna terminal T51 and a terminal T57.

The duplexer 82a includes a transmit filter 84a and a receive filter 86a. The duplexer 82b includes a transmit filter 84b and a receive filter 86b. The transmit filters 84a and 84b and the receive filters 86a and 86b are bandpass filters such as, for example, Surface Acoustic Wave (SAW) filters. The transmit filters 84a and 84b and the receive filters 86a and 86b may be acoustic wave filters such as boundary acoustic wave filters, Love wave filters, or filters formed of piezoelectric thin film resonators, or may be filters other than the acoustic wave filters.

In the duplexer 82a, the transmit filter 84a is connected between a common terminal T58 and a terminal T52, and the receive filter 86a is connected between the common terminal T58 and a terminal T53. In the duplexer 82b, the transmit filter 84b is connected between a common terminal T59 and a terminal T54, and the receive filter 86b is connected between the common terminal T59 and a terminal T55. The common terminal T58 of the duplexer 82a is coupled to the terminal T56 of the diplexer 80, and the common terminal T59 of the duplexer 82b is coupled to the terminal T57 of the diplexer 80. Thus, the diplexer 80 and the duplexers 82a and 82b form a quadplexer.

The transmit filters 84a and 84b respectively transmit signals in the transmit band to the common terminals T58 and T59 among transmission signals output from the terminals T52 and T54, and suppress signals in other bands. Transmission signals output to the common terminals T58 and T59 pass through the diplexer 80, and are then transmitted from the antenna 72. The receive filters 86a and 86b respectively transmit signals in the receive band to the terminals T53 and T55 among reception signals that have been received by the antenna 72, passed through the diplexer 80, and then been output from the common terminals T58 and T59, and suppress signals in other bands.

Each of the duplexers 82a and 82b allows transmission signals and reception signals in a frequency band, for example, below 2700 MHz to pass therethrough. For example, the duplexer 82a allows transmission signals and reception signals in Band1 (transmit band: 2500 MHz to 2570 MHz, receive band: 2620 MHz to 2690 MHz) to pass therethrough. The duplexer 82b allows transmission signals and reception signals in Band3 (transmit band: 1710 MHz to 1785 MHz, receive band: 1805 MHz to 1880 MHz) to pass therethrough.

The duplexer 82a allows transmission signals and reception signals in a frequency band higher than the frequency band of transmission signals and reception signals allowed to pass through the duplexer 82b to pass therethrough. Therefore, the HPF 80a making up the diplexer 80 allows transmission signals and reception signals allowed to pass through the duplexer 82a to pass therethrough, and suppresses transmission signals and reception signals allowed to pass through the duplexer 82b. The LPF 80b allows transmission signals and reception signals allowed to pass through the duplexer 82b to pass therethrough, and suppresses transmission signals and reception signals allowed to pass through the duplexer 82a.

Next, signal transmission and reception by the filters 26, 28, 46, and 48 will be described. Table 1 lists the switching state of the switch 44.

TABLE 1

| | Switch | |
|---|---|---|
| | Terminal T10 | Terminal T11 |
| 2.4 GHz-band WLAN, 5 GHz-band WLAN, Band42 | ON | OFF |
| 2.4 GHz-band WLAN, 5 GHz-band WLAN, Band43 | OFF | ON |

As listed in Table 1, when a 2.4 GHz-band WLAN signal (a signal in the first frequency band), a 5 GHz-band WLAN signal (a signal in the second frequency band), and a Band42 signal (a signal in the third frequency band) are simultaneously transmitted and/or received, the switch 44 selects and connects the terminal T10 to the antenna 70, and does not select the terminal T11. Accordingly, a 2.4 GHz-band WLAN transmission signal, a 5 GHz-band WLAN transmission signal, and a Band42 transmission signal respectively pass through the filters 26, 28, and 46, and are transmitted from the antenna 70. A 2.4 GHz-band WLAN reception signal, a 5 GHz-band WLAN reception signal, and a Band42 reception signal received by the antenna 70 respectively pass through the filters 26, 28, and 46, and are then respectively output to the terminals T2 through T4.

When a 2.4 GHz-band WLAN signal (a signal in the first frequency band), a 5 GHz-band WLAN signal (a signal in the second frequency band), and a Band43 signal (a signal in the fourth frequency band) are simultaneously transmitted and/or received, the switch 44 selects and connects the terminal T11 to the antenna 70, and does not select the terminal T10. Accordingly, a 2.4 GHz-band WLAN transmission signal, a 5 GHz-band WLAN transmission signal, and a Band43 transmission signal respectively pass through the filters 26, 28, and 48, and are then transmitted from the antenna 70. A 2.4 GHz-band WLAN reception signal, a 5 GHz-band WLAN reception signal, and a Band43 reception signal received by the antenna 70 respectively pass through the filters 26, 28, and 48, and are respectively output to the terminals T2, T3, and T5.

As described above, in the first embodiment, the filter 26 that allows transmission signals and reception signals in the first frequency band from 2.4 GHz to 2.5 GHz to pass therethrough is connected between the antenna terminal T1 and the terminal T2. The filter 28 that allows transmission signals and reception signals in the second frequency band from 5.0 GHz to 6.0 GHz to pass therethrough is connected between the antenna terminal T1 and the terminal T3. Furthermore, the filter 46 that allows transmission signals and reception signals in the third frequency band between the first frequency band and the second frequency band to pass therethrough and the filter 48 that allows transmission signals and reception signals in the fourth frequency band, which is between the first frequency band and the second frequency band and continuous with the third frequency band, to pass therethrough are coupled to the antenna terminal T1 through the switch 44.

Since the third frequency band and the fourth frequency band are continuous with each other, it is difficult to inhibit each of the filters 46 and 48 from being affected by signals of the other with use of a passive circuit such as a phase shifter. Thus, the filters 46 and 48 are coupled to the antenna terminal T1 through the switch 44. In addition, the third frequency band and the fourth frequency band are high frequency bands between the first frequency band from 2.4 GHz to 2.5 GHz and the second frequency band from 5.0 GHz to 6.0 GHz. Thus, it is difficult to use the antenna 72, which supports transmission and reception of signals in the frequency band below 2700 MHz passing through the duplexers 82a and 82b, to transmit and receive signals passing through the filters 46 and 48 without modification. When the antenna 72 is used to transmit and receive signals passing through the filters 46 and 48, the antenna 72 needs to be modified so as to support a wider band. When a new antenna is added to transmit and receive signals passing through the filters 46 and 48, the module size increases.

However, in the first embodiment, the antenna 70, which is used to transmit and receive signals in the first frequency band from 2.4 GHz to 2.5 GHz and the second frequency band from 5.0 GHz to 6.0 GHz, is used to transmit and receive signals passing through the filters 46 and 48. This configuration allows high-frequency signals passing through the filters 46 and 48 to be transmitted and received without accompanying large modification such as widening of the band of the antenna 72 or addition of another antenna.

Moreover, in the first embodiment, as illustrated in FIG. 1, the filters 26 and 28 are connected to the antenna terminal T1 without a switch. When the filters 26 and 28 are coupled to the antenna terminal T1 through a switch, a signal in the first frequency band passing through the filter 26 and a signal in the second frequency band passing through the filter 28 are not simultaneously transmitted and received. However, in the first embodiment, since the filters 26 and 28 are connected to the antenna terminal T1 without a switch, a signal in the first frequency band and a signal in the second frequency band can be simultaneously transmitted and received. When the filters 26 and 28 are coupled to the antenna terminal T1 through a switch, the space for the switch itself and a control system for controlling the switch needs to be secured, increasing the module size. The first embodiment can also inhibit the increase in size of the module. Each of the filters 26 and 28 are not affected by signals of the other even when the filters 26 and 28 are connected to the antenna terminal T1 without a switch because the first frequency band and the second frequency band depart from each other significantly.

The first embodiment has described an exemplary case where the third frequency band and the fourth frequency band are continuous with each other: for example, 3400 MHz to 3600 MHz and 3600 MHz to 3800 MHz, but does not intend to suggest any limitation. The third frequency band and the fourth frequency band may partially overlap each other. Even in this case, it is difficult to inhibit each of the filters 46 and 48 from being affected by signals of the other with a passive circuit such as a phase shifter. Therefore, the filters 46 and 48 are preferably coupled to the antenna terminal T1 through the switch 44.

In the first embodiment, the filter 26 may allow transmission signals and reception signals transmitted and received through a WLAN of IEEE 802.11g or IEEE 802.11b standard to pass therethrough. The filter 26 may allow transmission signals and reception signals in an Industry-Science-Medical (ISM) band from 2400 MHz to 2500 MHz instead of transmission signals and reception signals transmitted and received through the WLAN to pass therethrough. The filter 28 may allow transmission signals and reception signals transmitted and received through a WLAN of IEEE 802.11n or IEEE 802.11ac standard to pass therethrough, or may allow transmission signals and reception signals in an ISM band from 5725 MHz to 5875 MHz to pass therethrough.

The first embodiment has described an exemplary case where the third frequency band is the frequency band of Band42 and the fourth frequency band is the frequency band of Band43, but does not intend to suggest any limitation. The third frequency band and the fourth frequency band are only required to partially overlap each other or be continuous with each other between the first frequency band from 2.4 GHz to 2.5 GHz and the second frequency band from 5.0 GHz to 6.0 GHz.

The first embodiment has described an exemplary case where the filters 26, 28, 46, and 48 allow transmission signals and reception signals to pass therethrough, but the filters 26, 28, 46, and 48 may allow one of a transmission signal and a reception signal to pass therethrough.

Second Embodiment

Figure 2:
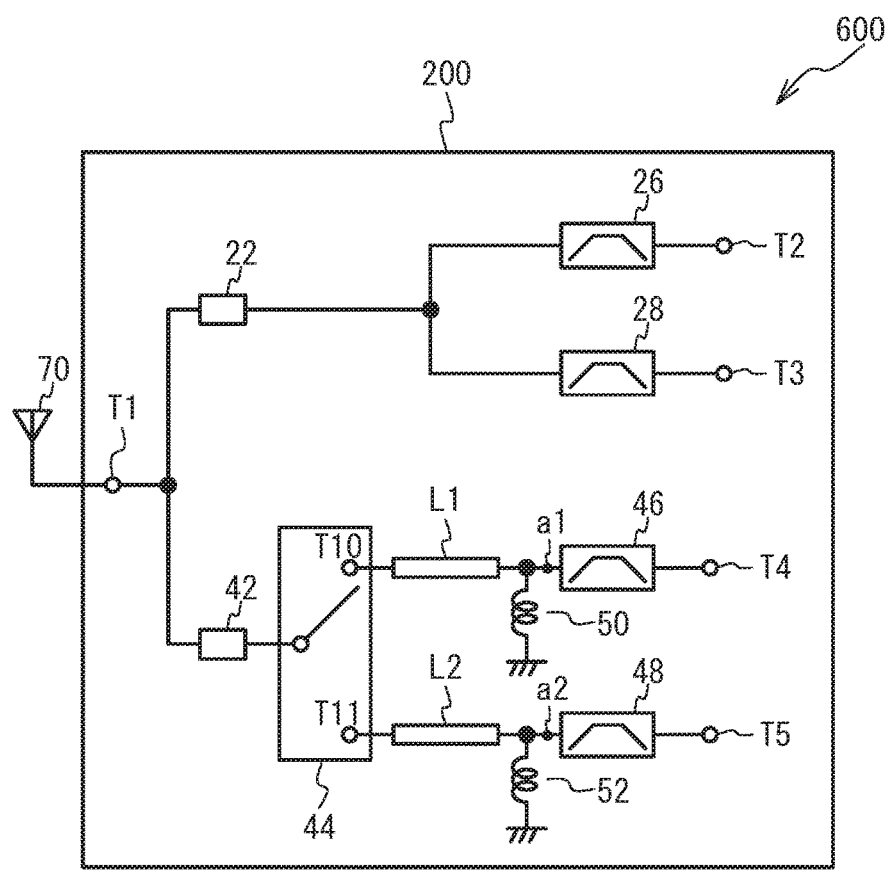
FIG. 2 illustrates a system including a module in accordance with a second embodiment.

FIG. 2 illustrates a system 600 including a module 200 in accordance with a second embodiment. As illustrated in FIG. 2, compared with the module 100 of the first embodiment, the module 200 includes phase shifters 22 and 42 and inductors 50 and 52, but does not include a circuit connected to the antenna 72. The line connecting the switch 44 and the filter 46 is indicated by L1, and the line connecting the switch 44 and the filter 48 is indicated by L2. The phase shifter 22 is connected between the antenna terminal T1 and the filters 26 and 28. The phase shifter 42 is connected between the antenna terminal T1 and the switch 44. The inductor 50 is connected between a node between the line L1 and the filter 46 and a ground. The inductor 52 is connected between a node between the line L2 and the filter 48 and a ground. Other configurations are the same as those of the first embodiment, and the description is thus omitted. Lines including the lines L1 and L2 and connecting elements have characteristic impedances of 50Ω. The magnitude of the impedance of the filter 46 when viewed from a point a1 between the node connecting to the inductor 50 and the filter 46 and the magnitude of the impedance of the filter 48 when viewed from a point a2 between the node connecting to the inductor 52 and the filter 48 are also 50Ω. As in the first embodiment, a circuit connected to the antenna 72 may be provided in the second embodiment.

The phase shifter 22 has an impedance that allows the filters 26 and 28 to be open-circuited when viewed from the antenna terminal T1 in the passband of the filter 46 (the third frequency band) when the switch 44 selects and connects the terminal T10 to the antenna 70. In addition, the phase shifter 22 has an impedance that allows the filters 26 and 28 to be open-circuited when viewed from the antenna terminal T1 in the passband of the filter 48 (the fourth frequency band) when the switch 44 selects and connects the terminal T11 to the antenna 70.

The phase shifter 42 has an impedance that allows the filter 46 to be open-circuited when viewed from the antenna terminal T1 in the passbands of the filters 26 and 28 (the first frequency band, the second frequency band) when the switch 44 selects and connects the terminal T10 to the antenna 70. In addition, the phase shifter 42 has an impedance that allows the filter 48 to be open-circuited as viewed from the antenna terminal T1 in the passbands of the filters 26 and 28 (the first frequency band, the second frequency band) when the switch 44 selects and connects the terminal T11 to the antenna 70.

The phase shifter 22 inhibits signals passing through the filters 26 and 28 from leaking to the filters 46 and 48, and the phase shifter 42 inhibits signals passing through the filters 46 and 48 from leaking to the filters 26 and 28.

Figure 3A:
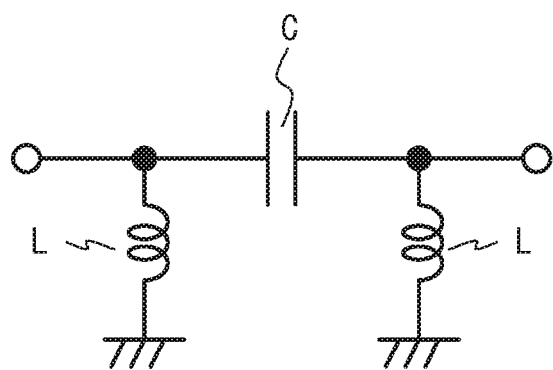
FIG. 3A and FIG. 3B illustrate exemplary circuit configurations of a phase shifter.
Figure 3B:
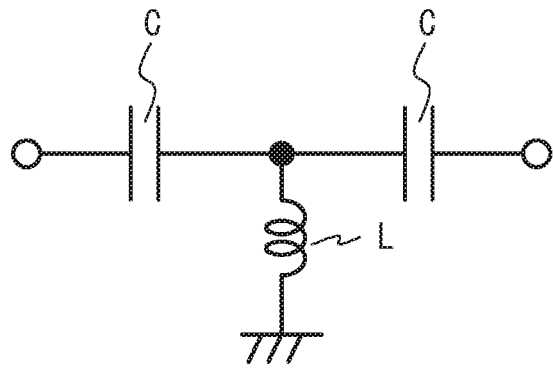

FIG. 3A and FIG. 3B illustrate exemplary circuit configurations of the phase shifters 22 and 42. The phase shifters 22 and 42 may be a π-type LCL circuit composed of one capacitor C and two inductors L as illustrated in FIG. 3A, or may be a T-type CLC circuit composed of two capacitors C and one inductor L as illustrated in FIG. 3B.

Here, a description will be given of the matching of the input and output impedances of the filters 46 and 48 with the characteristic impedances of the lines L1 and L2. As described above, the characteristic impedances of the lines L1 and L2 are 50Ω, and the magnitude of the impedance of the filter 46 when viewed from the point a1 and the magnitude of the impedance of the filter 48 when viewed from the point a2 are also 50Ω. However, since signals passing through the filters 46 and 48 are high-frequency signals, a capacitive reactance component is formed even when the resistance components of the impedances of the filters 46 and 48 when respectively viewed from the points a1 and a2 are 50Ω. To cancel the capacitive reactance component and match the input and output impedances of the filters 46 and 48 with the characteristic impedances of the lines L1 and L2, the inductors 50 and 52 are connected. This configuration will be described with FIG. 4.

Figure 4:
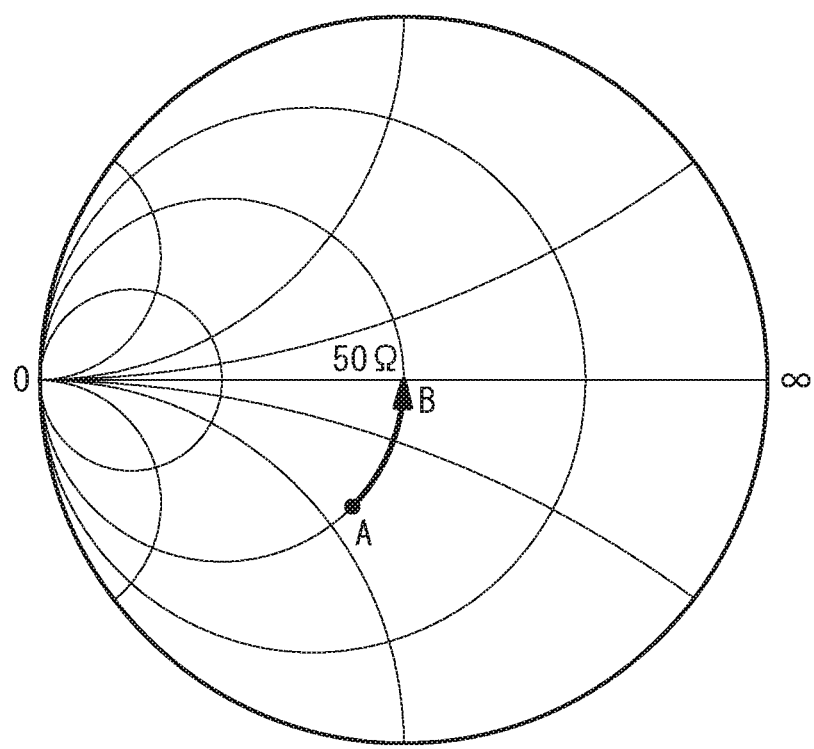
FIG. 4 is an admittance chart for describing impedance matching by an inductor.

FIG. 4 is an admittance chart for describing impedance matching by the inductors 50 and 52. As illustrated in FIG. 4, even when the resistance components of the impedances of the filters 46 and 48 when respectively viewed from the points a1 and a2 are 50Ω, the impedances of the filters 46 and 48 when respectively viewed from the points a1 and a2 become a point A because of the formation of a capacitive reactance component. The provision of the inductors 50 and 52 changes the impedances of the filters 46 and 48 when respectively viewed from the lines L1 and L2 from the point A to a point B. Accordingly, the input and output impedances of the filters 46 and 48 can be matched with the characteristic impedances of the lines L1 and L2.

In the second embodiment, as illustrated in FIG. 2, the inductor 50, which matches the input and output impedance of the filter 46 with the characteristic impedance of the line L1, is connected between the node between the line L1 and the filter 46 and a ground. The inductor 52, which matches the input and output impedance of the filter 48 with the characteristic impedance of the line L2, is connected between the node between the line L2 and the filter 48 and the ground. This configuration reduces the loss due to impedance mismatch.

Third Embodiment

Figure 5:
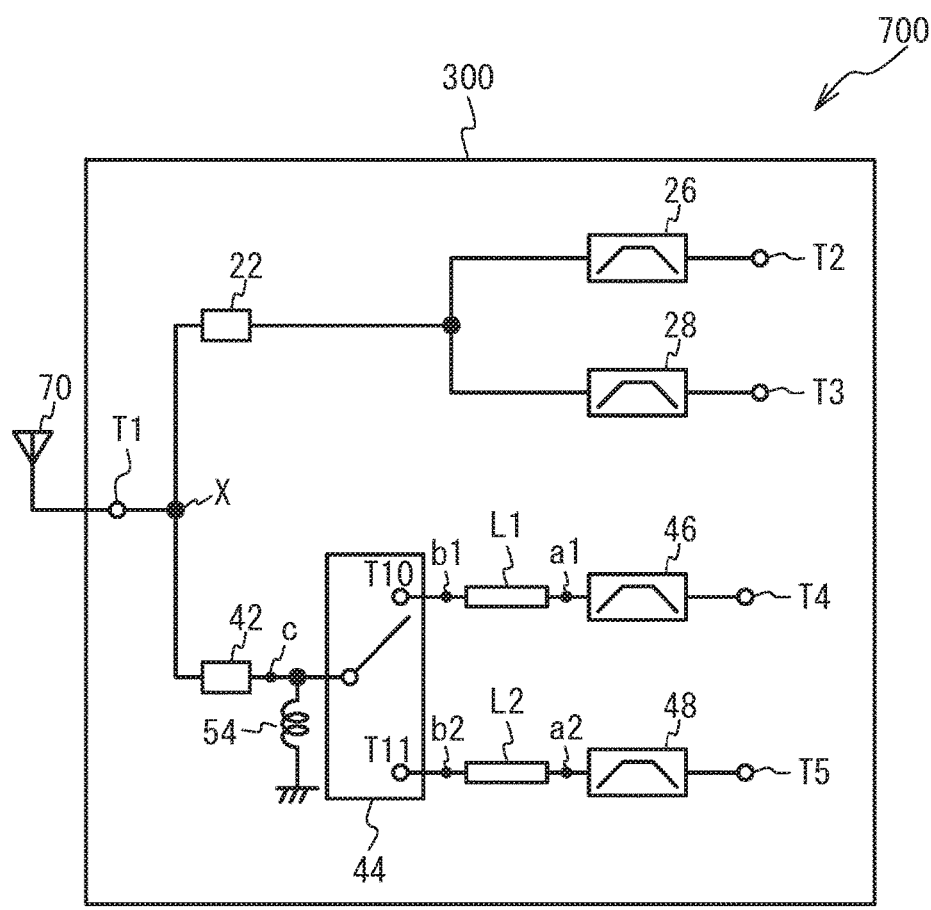
FIG. 5 illustrates a system including a module in accordance with a third embodiment.

FIG. 5 illustrates a system 700 including a module 300 in accordance with a third embodiment. As illustrated in FIG. 5, compared with the module 200 of the second embodiment, the module 300 includes none of the inductors 50 and 52, but includes an inductor 54 between a node between the phase shifter 42 and the switch 44 and a ground. Other configurations are the same as those of the second embodiment, and the description is thus omitted. The lines L1 and L2 have characteristic impedances greater than 50Ω, and lines, other than the lines L1 and L2, connecting elements have characteristic impedances of 50Ω. That is, the lines L1 and L2 have characteristic impedances greater than the impedance of the switch 44 when viewed from a diverging point X at which a line from the antenna terminal T1 diverges into a line to the filters 26 and 28 and a line to the switch 44. The magnitude of the impedance of the filter 46 when viewed from the point a1 between the line L1 and the filter 46 and the magnitude of the impedance of the filter 48 when viewed from the point a2 between the line L2 and the filter 48 are greater than 50Ω.

Figure 6:
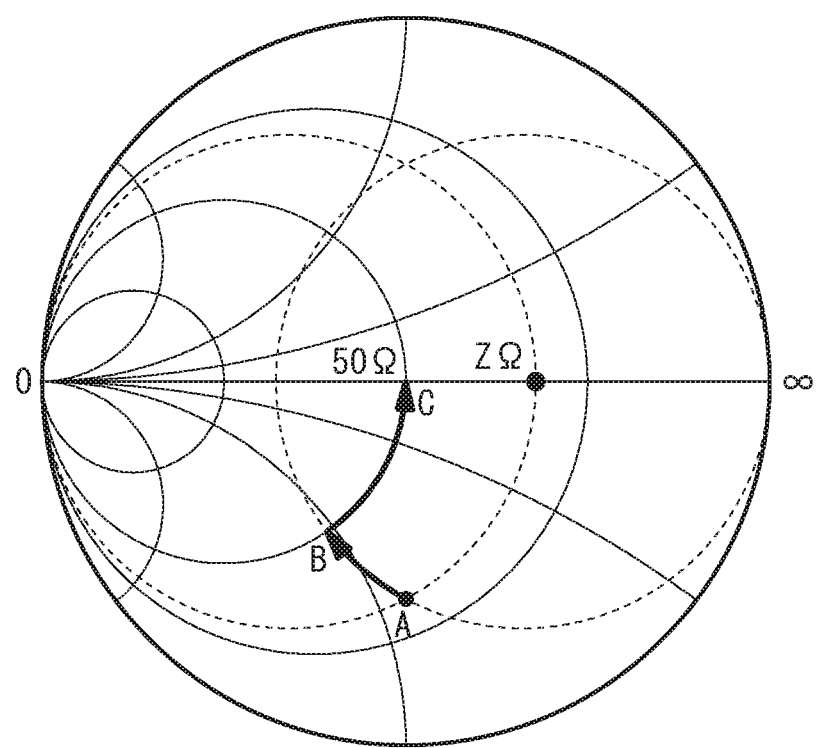
FIG. 6 is an admittance chart for describing impedance matching by a line and an inductor.

In the third embodiment, as in the second embodiment, since signals passing through the filters 46 and 48 are high-frequency signals, a capacitive reactance component is formed. FIG. 6 is used to describe cancellation of the capacitive reactance component and matching of the input and output impedances of the filters 46 and 48 with the impedance of the switch 44 when viewed from the diverging point X.

FIG. 6 is an admittance chart for describing impedance matching by the lines L1 and L2 and the inductor 54. As illustrated in FIG. 6, when the resistance components of the impedances (in FIG. 6, ZΩ) of the filters 46 and 48 when respectively viewed from the points a1 and a2 are greater than 50Ω and a capacitive reactance component is formed, the impedances of the filters 46 and 48 when respectively viewed from the points a1 and a2 become the point A.

The lines L1 and L2 change the impedances of the filters 46 and 48 when respectively viewed from points b1 and b2 between the lines L1 and L2 and the switch 44 (see FIG. 5) from the point A to the point B. The provision of the inductor 54 changes the impedances of the filters 46 and 48 when viewed from the point c between the node connecting to the inductor 54 and the diverging point X from the point B to the point C. Accordingly, the input and output impedances of the filters 46 and 48 can be matched with the impedance of the switch 44 when viewed from the diverging point X.

The lines L1 and L2 are wiring lines that connect the switch 44 and the filters 46 and 48 and are located on the substrate, and thus always formed. If the characteristic impedances of the lines L1 and L2 and the impedances of the filters 46 and 48 when respectively viewed from the points a1 and a2 remain 50Ω when the inductors 50 and 52 for impedance matching are to be integrated into the inductor 54 as in the second embodiment, the input and output impedances of the filters 46 and 48 cannot be matched with the impedance of the switch 44 when viewed from the diverging point X. Thus, to allow for the impedance matching described in FIG. 6, the characteristic impedances of the lines L1 and L2 and the impedances of the filters 46 and 48 when respectively viewed from the points a1 and a2 are made to be greater than the impedance of the switch 44 when viewed from the diverging point X.

In the third embodiment, the characteristic impedances of the lines L1 and L2 are greater than the impedance of the switch 44 when viewed from the diverging point X, and the impedances of the filters 46 and 48 when respectively viewed from the points a1 and a2 are greater than the impedance of the switch 44 when viewed from the diverging point X. Between the node between the diverging point X and the switch 44 and a ground, connected is the inductor 54 that matches the input and output impedances of the filters 46 and 48 with the impedance of the switch 44 when viewed from the diverging point X. This configuration can reduce the loss due to the impedance mismatch. In addition, compared to the second embodiment, the third embodiment can reduce the number of inductors, reducing the size of and the cost of the module.

Fourth Embodiment

Figure 7:
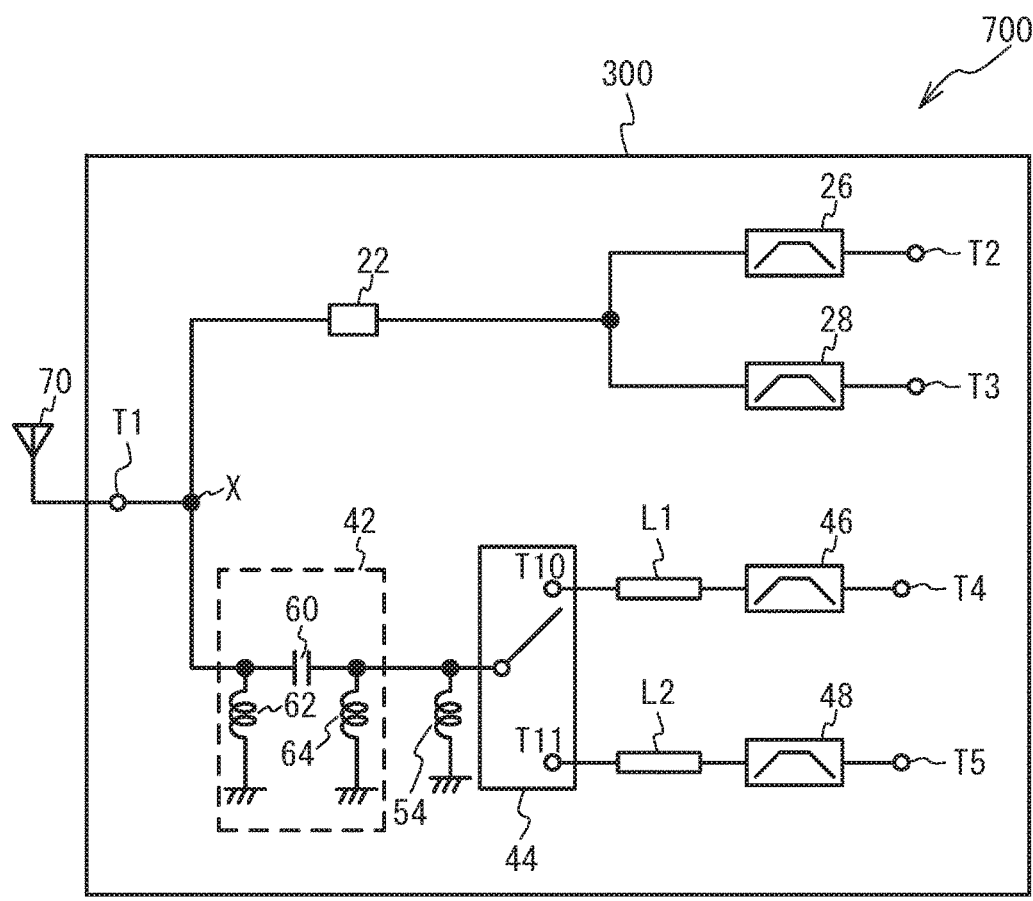
FIG. 7 illustrates a system in which a phase shifter of the module of the second embodiment is composed of one capacitor and two inductors.

FIG. 7 illustrates the system 700 in which the phase shifter 42 of the module 300 of the third embodiment is composed of one capacitor 60 and two inductors 62 and 64. As illustrated in FIG. 7, the phase shifter 42 includes the capacitor 60 connected in series between the antenna terminal T1 and the switch 44, the inductor 62 connected between a node between the antenna terminal T1 and the capacitor 60 and a ground, and the inductor 64 connected between a node between the switch 44 and the capacitor 60 and a ground. The inductance of the inductor 62 is approximately equal to the inductance of the inductor 64.

Figure 8:
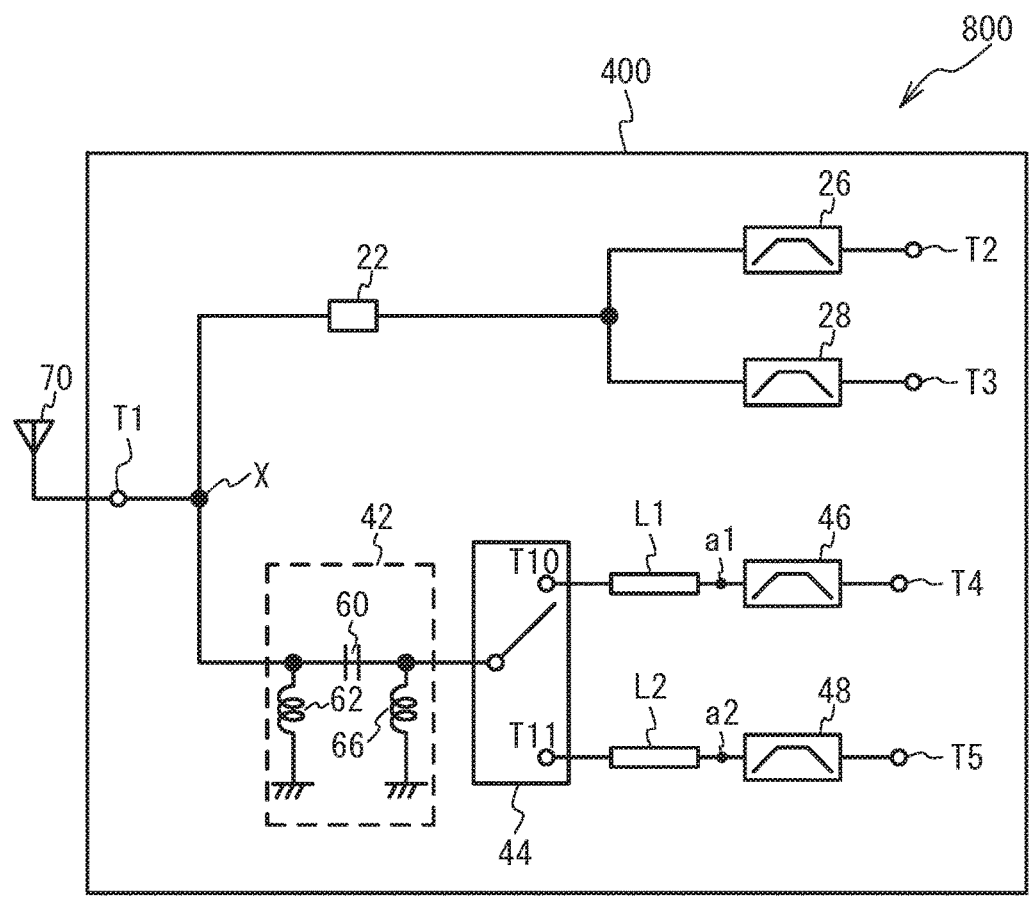
FIG. 8 illustrates a system including a module in accordance with a fourth embodiment.

FIG. 8 illustrates a system 800 including a module 400 in accordance with a fourth embodiment. As illustrated in FIG. 8, compared with the module 300 of the third embodiment illustrated in FIG. 7, in the module 400 of the fourth embodiment, the inductor 54 for impedance matching and the inductor 64 of the phase shifter 42 are integrated into an inductor 66. That is, the inductor 66 has a function that matches the input and output impedances of the filters 46 and 48 with the impedance of the switch 44 when viewed from the diverging point X. Thus, the inductor 66 has an inductance less than the inductance of the inductor 62. Other configurations are the same as those of the second embodiment, and thus the description is omitted.

In the fourth embodiment, the characteristic impedances of the lines L1 and L2 are greater than the impedance of the switch 44 when viewed from the diverging point X, and the impedances of the filters 46 and 48 when respectively viewed from the points a1 and a2 are greater than the impedance of the switch 44 when viewed from the diverging point X. The phase shifter 42 is composed of the capacitor 60 connected in series and the inductors 62 and 66 connected in parallel, and the inductor 66 has an inductance less than the inductance of the inductor 62. This configuration can also match the impedance as in the third embodiment, and thus reduces the loss due to impedance mismatch. In addition, the number of inductors can be further reduced, the size of the module can be further reduced, and the cost can be further reduced.

Although the embodiments of the present invention have been described in detail, it is to be understood that the various change, substitutions, and alterations could be made hereto without departing from the spirit and scope of the invention.

What is claimed is:

1. A module comprising:
a first filter that is connected between an antenna terminal and a first terminal, and allows a transmission signal and/or a reception signal in a first frequency band from 2.4 GHz to 2.5 GHz to pass therethrough, the antenna terminal being coupled to an antenna;
a second filter that is connected between the antenna terminal and a second terminal, and allows a transmission signal and/or a reception signal in a second frequency band from 5.0 GHz to 6.0 GHz to pass therethrough;
a switch that includes a first terminal and a second terminal, and selects and connects one of the first terminal and the second terminal to the antenna;
a third filter that is connected between the first terminal of the switch and a third terminal, and allows a transmission signal and/or a reception signal in a third frequency band between the first frequency band and the second frequency band to pass therethrough; and
a fourth filter that is connected between the second terminal of the switch and a fourth terminal, and allows a transmission signal and/or a reception signal in a fourth frequency band that is between the first frequency band and the second frequency band and partially overlaps with or is continuous with the third frequency band to pass therethrough,
wherein the first filter, the second filter, the third filter and the fourth filter are coupled to the antenna terminal without a diplexer interposed in between.

2. The module according to claim 1, wherein
the first filter and the second filter are coupled to the antenna terminal without a switch.

3. The module according to claim 1, wherein
the first filter and the second filter allow a transmission signal and/or a reception signal transmitted and/or received through a wireless LAN to pass therethrough.

4. The module according to claim 1, wherein
the third frequency band is a frequency band of Band42, and the fourth frequency band is a frequency band of Band43.

5. A module comprising:
a first filter that is connected between an antenna terminal and a first terminal, and allows a transmission signal and/or a reception signal in a first frequency band from 2.4 GHz to 2.5 GHz to pass therethrough, the antenna terminal being coupled to an antenna;
a second filter that is connected between the antenna terminal and a second terminal, and allows a transmission signal and/or a reception signal in a second frequency band from 5.0 GHz to 6.0 GHz to pass therethrough;
a switch that includes a first terminal and a second terminal, and selects and connects one of the first terminal and the second terminal to the antenna;
a third filter that is connected between the first terminal of the switch and a third terminal, and allows a transmission signal and/or a reception signal in a third frequency band between the first frequency band and the second frequency band to pass therethrough;
a fourth filter that is connected between the second terminal of the switch and a fourth terminal, and allows a transmission signal and/or a reception signal in a fourth frequency band that is between the first frequency band and the second frequency band and partially overlaps with or is continuous with the third frequency band to pass therethrough;
a first phase shifter that is connected between the antenna terminal and the first filter and the second filter; and
a second phase shifter that is connected between the antenna terminal and the switch,
wherein when the switch selects and connects the first terminal of the switch to the antenna, the first phase shifter has an impedance that allows the first filter and the second filter to be open-circuited when viewed from the antenna terminal in the third frequency band, and the second phase shifter has an impedance that allows the third filter to be open-circuited when viewed from the antenna terminal in the first frequency band and the second frequency band, and
when the switch selects and connects the second terminal of the switch to the antenna, the first phase shifter has an impedance that allows the first filter and the second filter to be open-circuited when viewed from the antenna terminal in the fourth frequency band, and the second phase shifter has an impedance that allows the fourth filter to be open-circuited when viewed from the antenna terminal in the first frequency band and the second frequency band.

6. The module according to claim 5, further comprising:
a first line that connects the switch and the third filter, and has a characteristic impedance greater than an impedance of the switch when viewed from a diverging point at which a line from the antenna terminal diverges into a line to the first filter and the second filter and a line to the switch; and
a second line that connects the switch and the fourth filter, and has a characteristic impedance greater than the impedance of the switch viewed from the diverging point,
wherein an impedance of the third filter when viewed from a point between the first line and the third filter and an impedance of the fourth filter when viewed from a point between the second line and the fourth filter are greater than the impedance of the switch when viewed from the diverging point, and
the second phase shifter includes:
    a capacitor connected in series between the antenna terminal and the switch;
    a first inductor connected between a node between the antenna terminal and the capacitor and a ground; and
    a second inductor that is connected between a node between the switch and the capacitor and a ground, and has an inductance greater than an inductance of the first inductor.

7. The module according to claim 6, wherein
the second inductor matches input and output impedances of the third filter and the fourth filter with the impedance of the switch when viewed from the diverging point.

8. A module comprising:
a first filter that is connected between an antenna terminal and a first terminal, and allows a transmission signal and/or a reception signal in a first frequency band from 2.4 GHz to 2.5 GHz to pass therethrough, the antenna terminal being coupled to an antenna;
a second filter that is connected between the antenna terminal and a second terminal, and allows a transmission signal and/or a reception signal in a second frequency band from 5.0 GHz to 6.0 GHz to pass therethrough;
a switch that includes a first terminal and a second terminal, and selects and connects one of the first terminal and the second terminal to the antenna;
a third filter that is connected between the first terminal of the switch and a third terminal, and allows a transmission signal and/or a reception signal in a third frequency band between the first frequency band and the second frequency band to pass therethrough;
a fourth filter that is connected between the second terminal of the switch and a fourth terminal, and allows a transmission signal and/or a reception signal in a fourth frequency band that is between the first frequency band and the second frequency band and partially overlaps with or is continuous with the third frequency band to pass therethrough;
a first line that connects the switch and the third filter;
a second line that connects the switch and the fourth filter;
a first inductor that is connected between a node between the first line and the third filter and a ground, and matches an input and output impedance of the third filter with a characteristic impedance of the first line; and
a second inductor that is connected between a node between the second line and the fourth filter and a ground, and matches an input and output impedance of the fourth filter with a characteristic impedance of the second line.

9. A module comprising:
a first filter that is connected between an antenna terminal and a first terminal, and allows a transmission signal and/or a reception signal in a first frequency band from 2.4 GHz to 2.5 GHz to pass therethrough, the antenna terminal being coupled to an antenna;
a second filter that is connected between the antenna terminal and a second terminal, and allows a transmission signal and/or a reception signal in a second frequency band from 5.0 GHz to 6.0 GHz to pass therethrough;
a switch that includes a first terminal and a second terminal, and selects and connects one of the first terminal and the second terminal to the antenna;
a third filter that is connected between the first terminal of the switch and a third terminal, and allows a transmission signal and/or a reception signal in a third frequency band between the first frequency band and the second frequency band to pass therethrough;
a fourth filter that is connected between the second terminal of the switch and a fourth terminal, and allows a transmission signal and/or a reception signal in a fourth frequency band that is between the first frequency band and the second frequency band and partially overlaps with or is continuous with the third frequency band to pass therethrough;
a first line that connects the switch and the third filter, and has a characteristic impedance greater than an impedance of the switch viewed from a diverging point at which a line from the antenna terminal diverges into a line to the first filter and the second filter and a line to the switch;
a second line that connects the switch and the fourth filter, and has a characteristic impedance greater than the impedance of the switch when viewed from the diverging point; and
an inductor that is connected between a node between the diverging point and the switch and a ground, and matches input and output impedances of the third filter and the fourth filter with the impedance of the switch when viewed from the diverging point,
wherein an impedance of the third filter when viewed from a point between the first line and the third filter and an impedance of the fourth filter when viewed from a point between the second line and the fourth filter are greater than the impedance of the switch when viewed from the diverging point.

* * * * *